Feb. 15, 1944.  H. KIESER  2,341,624
SPEED RESPONSIVE REGULATOR FOR HYDRAULIC GEARS
Filed Oct. 8, 1940  3 Sheets-Sheet 2
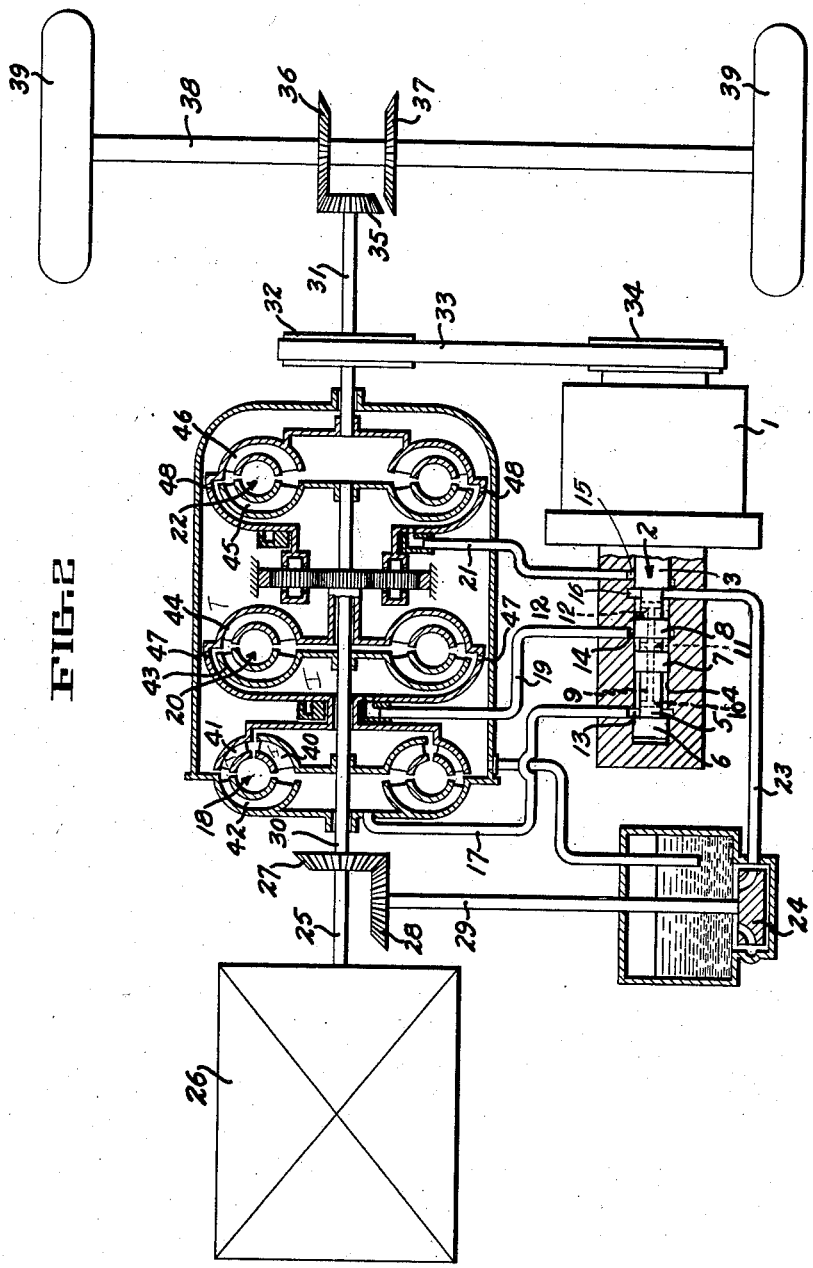
INVENTOR
HUGO KIESER
BY
ATTORNEYS

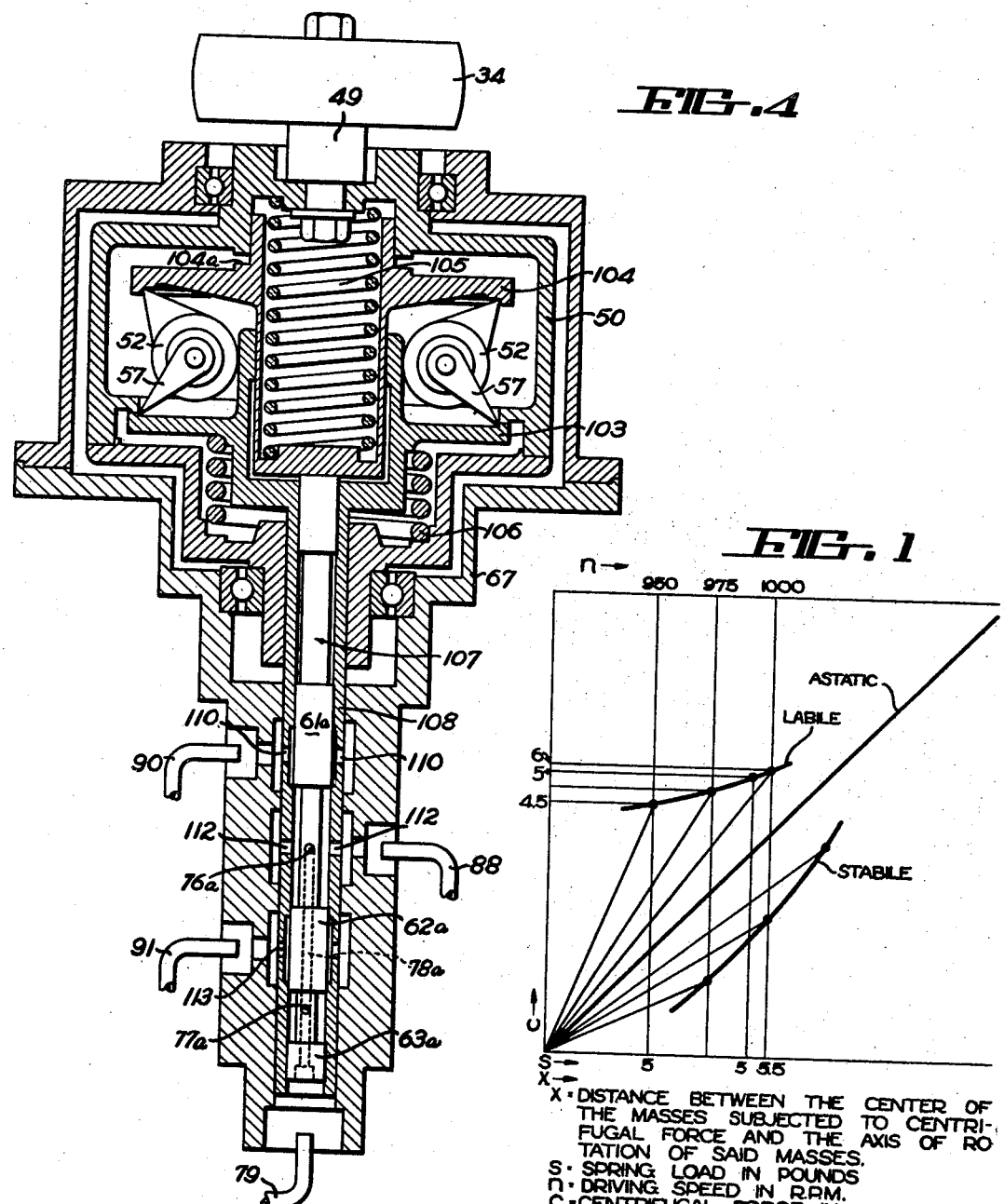

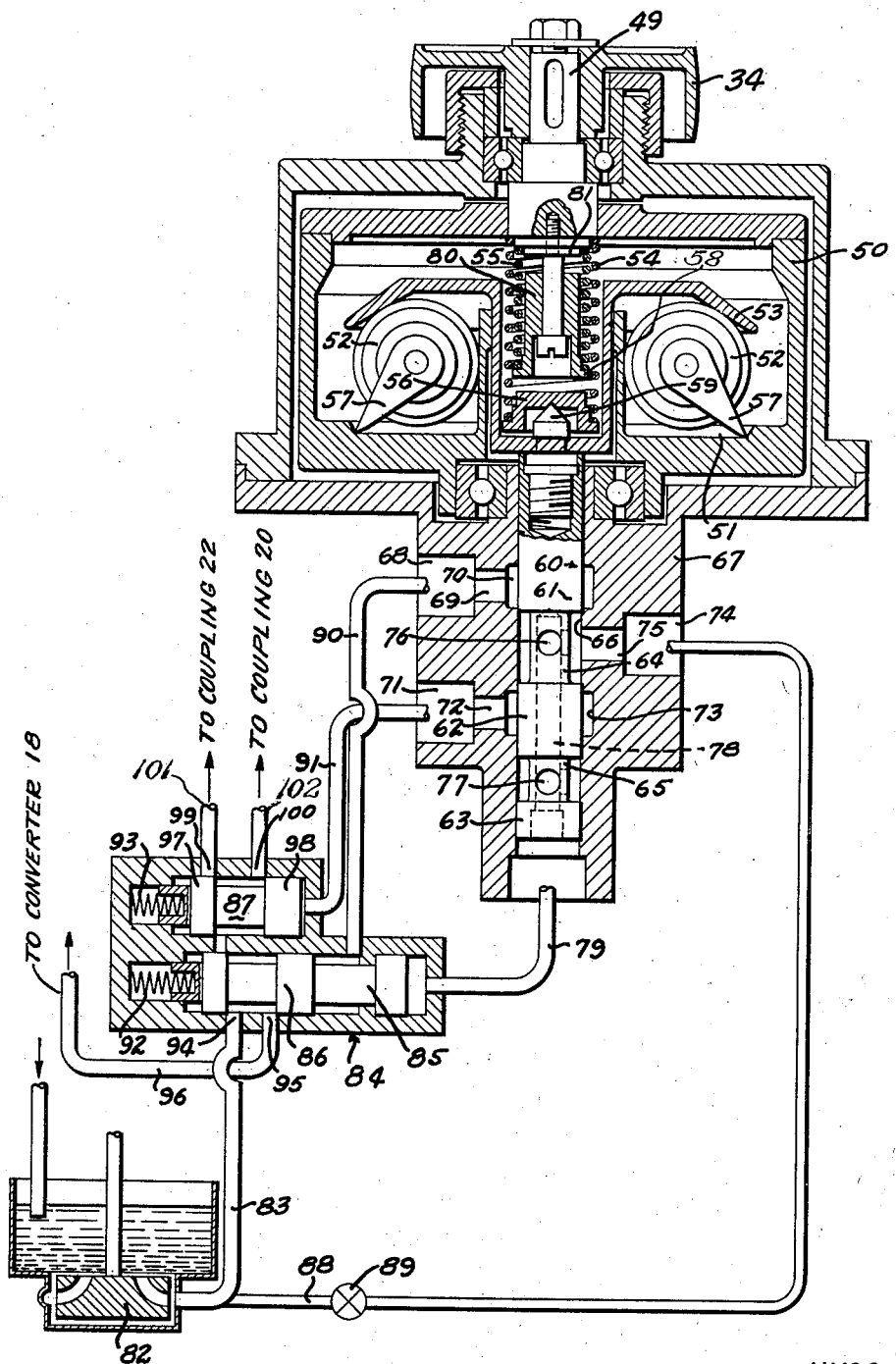

Patented Feb. 15, 1944

2,341,624

UNITED STATES PATENT OFFICE 2,341,624

SPEED-RESPONSIVE REGULATOR FOR HYDRAULIC GEARS

Hugo Kieser, Heidenheim, Brenz, Germany, assignor to American Voith Contact Company, Inc., New York, N. Y.

Application October 8, 1940, Serial No. 360,333

10 Claims. (Cl. 60—54)

The invention relates to speed-responsive regulators, and in particular to speed-responsive regulators for use in connection with power transmissions.

With speed-responsive regulators heretofore known and used in connection with the shifting of speed gears, it is necessary to shift the gears by hand or mechanically in response to the magnitude of a certain factor of operation. The shifting operation by hand has the drawback that too much reliance is placed upon the operator who is likely to change the speed too early or too late, thereby causing the driving motor to work uneconomically.

The known mechanical or automatic speed changing devices are normally rather complicated and particularly objectionable for the reason that at one and the same driving speed they may shift upwardly as well as downwardly, with the result that they tend to swing back and forth at the desired shifting or speed changing point.

Therefore, it is an object of the invention to provide a speed-responsive regulator for power transmissions, in which the speed shifting points are stabilized, thereby preventing the tendency of previous speed-responsive devices to oscillate at the speed shifting points.

It is another object of the invention to provide a speed-responsive regulator for effecting the speed change of power transmissions, in which the point at which the shifting up from one speed to another speed takes place, differs from that point at which the shifting down from the last mentioned speed to the first mentioned speed is effected.

It is a further object of the invention to provide a speed-responsive regulator for power transmissions in which the shifting up from one speed to the next higher speed is effected at a driving speed which is higher than the speed at which the reverse shifting movement is effected.

Still another object of the invention is to provide a speed-responsive regulator in connection with hydraulic power transmissions, in which the speed regulator operates controlling means which directly control the supply of driving fluid to said power transmissions.

A still further object of the invention consists in the provision of a speed-responsive regulator in combination with a control system for power transmissions in which the speed-responsive regulator, by the intervention of pilot means, operates controlling means controlling the supply of driving fluid to the power transmission pertaining thereto.

These and other objects and advantages will appear more clearly from the following specification in connection with the accompanying drawings, in which:

Figure 1 is a graph illustrating the principle of the invention;

Figure 2 shows a hydraulic power transmission in connection with a speed-responsive regulator according to the invention;

Figure 3 is a first embodiment of a speed-responsive regulator according to the invention, and Figure 4 is a second embodiment of the invention.

The present application is a continuation-in-part application of my pending application, Serial Number 169,482, filed October 16, 1937, now abandoned.

General arrangement

The stabilization of the speed shifting points, i. e., the separation of the point at which shifting up is effected from the point at which the shifting downward operation is initiated, is obtained according to the present invention by the provision of a labile regulator, that is, a governor in which a predetermined centrifugal force acting upon a rotating mass or body is overcome by the action of one or more springs of labile characteristic. To more clearly elucidate this point, reference may be had to the graph of Figure 1.

The centrifugal force produced by the rotating mass of a regulator or governor is ordinarily designated $C$, while the distance from the center of the rotating mass to the axis of rotation is ordinarily designated $x$. If now the centrifugal forces $C$, which may be determined by calculation or experiments, are plotted as ordinates of curves and the corresponding distances $x$ are plotted as abscissae, the regulating curves obtained are the so-called $C$ curves showing the characteristics of the regulator or governor. From such $C$ curves the operating characteristics of the regulator may be obtained without any further information.

In order to determine the operating characteristics of a $C$ curve, a straight line is drawn from the origin of the co-ordinates to different points on the respective $C$ curve. If, with an increasing distance $x$, the angle between the said straight lines and the abscissae increases, the regulator or governor is said to possess stabilizing characteristics. If, with an increasing distance $x$ the said angle remains the same, the regulator or governor is said to possess astatic operating characteristics. If, however, with an increasing distance $x$ the angle between the said straight lines and the abscissae decreases, the governor or regulator is said to possess labile operating characteristics.

Figure 1 shows three curves of labile, stabile, and astatic characteristics. Whether the governor or regulator operates as a stabile, astatic or labile regulator depends on the selection of characteristics of its loading spring or springs. According to the present invention, the loading spring or springs must have such characteristics as to produce a labile regulator operation in the sense of the above explanation.

Due to the provision of a regulator with labile characteristics, according to the present invention, it has been made possible to separate the point at which the shifting up from one speed to the next higher speed is effected, from the point at which the reverse shifting movement is initiated. More specifically, according to the present invention, the shifting up operation from one speed to another speed is effected at a driving speech which is higher than the driving speed at which the reverse shifting operation becomes effective. The difference in the driving speed between two adjacent change-over points for upward and downward shifting, can be established through a corresponding choice of the spring characteristics.

Structural arrangement

Referring to Figure 2, 1 designates a speed governor according to the present invention which is adapted to reciprocate a valve member generally designated 2. The valve member 2 comprises a shaft 3 smoothly fitting in a bore 4 and connected with a shaft 5 of smaller diameter which carries three spaced pistons 6, 7 and 8 respectively. The shaft 5 includes a longitudinal bore 9 with transverse bores 10, 11 and 12. The shaft 5 with the pistons 6, 7 and 8 is reciprocably mounted in the bore 4 for controlling ports 13, 14, 15 and 16.

The port 13 is connected with a conduit 17 leading to the hydraulic torque converter 18 which is provided with an impeller 40, a runner 41 and a guide wheel 42.

The port 14 communicates through the conduit 19 with the coupling 20 comprising an impeller 43 and a runner 44.

The port 15 is connected with a conduit 21 leading to the hydraulic coupling 22 having an impeller 45 and a runner 46.

Finally, the port 16 is connected by means of the conduit 23 with a filling pump 24 which is actuated by the driving shaft 25 of a motor 26 through the intervention of a beveled gear 27, 28 and a shaft 29 carrying the latter.

The impellers of the converter 18 and couplings 20 and 22 are connected with the shaft 30 which is drivingly connected with the beveled gear 27. The runners of the converter and couplings are drivingly connected with the shaft 31 having rigidly mounted thereon, a pulley 32, which by means of a belt 33 drives a pulley 34 of the regulator 1. Also rigidly connected with the shaft 31 is a beveled gear 35 adapted to cooperate with the beveled gears 36 and 37 provided on the axle 38 carrying the wheels 39.

As will be seen from Figure 2, the position of the pistons 6, 7 and 8 controls the supply of fluid from the filling pump 24 to the converter and the couplings for filling the same with driving fluid. When the supply of driving fluid to the couplings is interrupted due to the position of the valve member 2, the driving fluid in said couplings will be discharged through bores 47 and 48 positioned therein. Also the torque converter 18 is emptied in a similar manner when the supply of fluid thereto is shut off.

Referring now to Figure 3 illustrating the first embodiment of the speed regulator according to the invention, it will be noted that the pulley 34, driven by the secondary shaft 31 and the pulley 32, is rigidly connected with the regulator shaft 49, by means of a key. The regulator shaft 49 is fixed to a rotating casing 50, which comprises grooves 51 having slidably mounted therein, centrifugal masses or bodies 52. The centrifugal bodies 52 are covered by a dish-shaped disc 53 which is adapted to be maintained under pressure of the springs 54 and 55 and to be lifted against the thrust of said springs when the centrifugal force acting upon the masses or bodies 52 causes the latter to swing about the lowermost point of their supports 57. One spring governs the shifting operation from a first speed to a second speed and vice versa, while the both springs govern the shifting operation from the second speed to the third speed and vice versa.

In the embodiment of Figure 3, the spring 54 comes into operation at the first control range and allows the masses or bodies 52 to move under the influence of the centrifugal force until their movement is stopped by the engagement of the member 56 with the stop 58. The member 56 is supported by the dish-shaped disc 53 and the upper portion 59 of the control piston 60 carried by the disc 53. The upward movement of the disc 53 lifts the control piston 60 connected therewith accordingly.

The control member 60 has three valve head or piston portions 61, 62 and 63 separated from each other by piston shaft portions 64 and 65 of smaller diameter than the valve head portions 61, 62 and 63. The valve head portions 61, 62 and 63 are smoothly fitting and reciprocably mounted in a bore 66 of a casing 67 surrounding the rotating casing 50. The casing 67 includes a port 68 communicating through a passageway 69 with an enlarged annular portion 70 of the bore 66. Similarly, the casing 67 includes a port 71 communicating through a passageway 72 with an enlarged annular portion 73 of the bore 66.

Furthermore, the port 74 in the casing 67 communicates with the bore 66 through a passageway 75. The piston shaft portions 64 and 65 are provided with transverse bores 76 and 77 respectively which communicate with each other through a longitudinal bore 78 passing through the lower end of the valve head portion 63, so that fluid may pass from the longitudinal bore 78 into the bore 66 below the valve head portion 63, and from there into the conduit 79.

When the driving speed and thereby the centrifugal force acting upon the centrifugal masses 52 has increased to a predetermined extent, a second spring 55 will be compressed by the upward movement of the disc 53 until the member 80 supporting the lower end of the spring 55 engages the stop 81. Consequently, the control member 60 then occupies a position different from the position in which only the first spring was compressed. The control member 60 is so arranged that it is balanced and that only slight force is necessary for effecting a sliding movement thereof, as will presently appear.

Referring to Figure 3, it will be noted that each surface on the control member 60, which is acted upon by fluid in one direction, has a corresponding surface acted upon by the fluid in the opposite direction with the exception of the lowermost front surface of the control member 60, i. e., adjacent the inlet of the conduit 79. However, the pressure acting upon the said surface prevails as long as the power transmission is operating, i. e., as long as the pump 82 is running and the valve 89 is open, so that without any difficulties the pressure acting upon the lowermost surface of the control member 60 is balanced by a corresponding dimensioning of the springs acting upon the opposite side of the control member 60. The control member 60 is, therefore, actually balanced during the operation of this system.

The hydraulic circuit associated with the speed-responsive regulator of Figure 3 also comprises a pressure conduit 83 leading from pump 82 to the main control valve 84 in which three valve pistons 85, 86 and 87 are reciprocably mounted. From the filling conduit 83 branches off a regulating conduit 88 leading to the port 74 of the regulator casing 67 and including the shutoff valve 89. So long as the valve 89 is closed, the conduits 90 and 91 respectively communicating with the ports 68 and 71 and leading to the main control valve 84 and the conduit 79 likewise leading to the main control valve 84 are without pressure fluid. In this instance, the valve pistons 85, 86 and 87 are forced toward the right hand end positions by springs 92 and 93 housed in the main control valve 84 so that the flow of pressure fluid from the supply pump 82 through the conduit 83 is blocked.

The piston 86 controls, in addition to the intake port 94 communicating with the conduit 83, the discharge port 95 communicating with the conduit 96 leading to a torque converter 18 illustrated in Figure 2. The piston 87 with the piston portions 97 and 98, controls the ports 99 and 100 respectively communicating with conduits 101, 102 leading to couplings 22 and 20, as likewise illustrated in Figure 2.

As will be seen from the above, the control member 60 of the embodiment of Figure 3 takes the place of a pilot piston, whereas in Figure 2 the control piston 2 directly controls the supply of fluid to the converter and couplings.

Figure 4 shows a modification of the invention, as illustrated in Figure 3, in which the centrifugal masses 52 are mounted between separate discs 103 and 104 loaded respectively by springs 106 and 105 which impose different restoring forces. The arms 57 are pivotally connected with the respective masses 52 so as to allow outward movement thereof when a predetermined centrifugal force acts upon said masses. Furthermore, the control member 60 of Figure 3 is replaced by two separate control members 107 and 108, in which the control member 107 is slidably mounted in the control member 108. The control member 107 is provided with three piston portions 61a, 62a and 63a corresponding to the piston portions 61, 62 and 63 of Figure 3. The control member 107 is also provided with a longitudinal bore 78a having inlet and outlet openings 76a and 77a respectively. The hollow control member 108 has transverse bores 110, 111 and 112. Otherwise, the parts of Figure 4 correspond to those of Figure 3 and are, therefore, designated with the same reference numerals so that no further description thereof is necessary.

Operation

Supposing the valve 89 is opened by the vehicle operator and the regulator control plunger 60 and its associated parts are positioned as shown in Figure 3. Pressure fluid then passes through the conduit 88, the valve 89 and the port 74 in the casing 67, from here the fluid passes through the bores 76, 78 and 66 into the conduit 79. The fluid will then act upon the piston 85 in the main valve 84 and move the piston 85 together with the piston 86 into the position shown in Figure 3. When this occurs, a fluid connection is established between the filling conduit 83 and the conduit 96 leading to the torque converter 18, whereupon the latter while rotating fills with fluid and imparts a predetermined speed upon the wheels 39.

When the driving speed now rises to the point where the centrifugal masses or bodies of the regulator compress the loading spring 54 as far as the abutment or stop 58, then the control member 60 connected to the regulating disc or sleeve 53 is shifted by a sufficient amount so that pressure fluid can now pass from the conduit 88 through bores 66 and 70 into the conduit 90. The piston 86 in the main control valve 84 will then be shifted to the left, and the fluid supply for filling the conduit 102 of the power transmitter 20 will be released. The power transmitter 20 will then be filled with fluid while the supply of fluid to torque converter 18 is shut off and the converter is emptied so that a higher speed is imparted upon the wheels 39.

With a further increase in the speed of rotation, the control member 60 is lifted still further, thereby establishing communication between the port 74 and the annular recess 73 through bore 78. As the result, pressure fluid from the pump 82 passes through the conduit 88, the port 74, the conduit 72, and the port 71 into the conduit 91, from here the fluid passes into the valve 84 where it acts upon the piston 87 so as to shift the latter to the left. In this position, it blocks the supply of fluid to the fluid power transmitter 20 and releases fluid to the fluid power transmitter 22. In this manner, the change of motion is performed in a complete automatic way, depending upon the speed.

The coupling circuits are emptied by discharge ports 47, 48 through which, during operation, a limited quantity of fluid is passed from the coupling circuits into a tank for cooling purposes and replaced by the filling pump 82. The converter circuit is emptied through similar discharge ports. When the fluid supply to any turbo circuit is interrupted due to the shifting of the control member 60, this turbo circuit is emptied by centrifugal force through its discharge ports.

The operation of the arrangement of Figure 2 is similar to that of Figure 3. However, while in Figure 3 the movement of the centrifugal masses 52 and the control member 60 operated thereby, control the main control valve 84 which in its turn controls the fluid supply to the several transmitters, the control piston 2 of Figure 2, directly controls the supply of pressure fluid from the filling pump 24 to the respective transmitter.

The operation of the modification shown in Figure 4 differs from that of Figure 3 merely in that first the weaker spring 105 is compressed when the masses 52, due to centrifugal forces acting thereupon, move outwardly until the disc 104 with its shoulder 104a abuts the casing 50, whereupon further outward movement of the masses 52 causes the latter to depress the control member 108 against the thrust of the stronger spring 106. Consequently, control member 107, corresponding to control member 61 of Figure 3 acts first so as to move upwardly from the position shown in Figure 4, thereby establishing fluid connection between the bores 112 and 110. In the manner described in connection with Figure 3, fluid may now pass from conduit 88 into conduit 90. When the centrifugal force acting upon the masses 52 further increases and reaches a predetermined value, member 103, and thereby the control member 108, moves downwardly against the thrust of spring 103, so as to establish fluid connection between the outlet 77a and the bores 113 and, consequently, also between the conduits 88 and 91. In other words, the movement of the control member 107 controls the fluid supply to the conduit 90 in the same manner as the piston portion 61 of Figure 3, while the control piston 108 controls the fluid supply to the conduit 91 similar to the piston portion 62 of Figure 3.

To illustrate the different stages during an actual shifting operation, reference may again be had to Figure 1, and for the sake of simplicity, it may be assumed that the regulator works without friction while the weight of the centrifugal masses 52 and the control member 60 is to be considered as a portion of the load acting upon the springs.

It may further be assumed that the vehicle is driving with a speed of 950 revolutions per minute, while the actual shifting movement is to be effected at 1000 revolutions per minute. While at a driving speed of 950 revolutions per minute, with the spring in its expanded position, the spring load will be higher than the centrifugal force, the situation materially changes with the increase of the driving speed.

It is characteristic for a labile regulator that the increase in the spring load with increasing driving speed is less than the increase in the centrifugal force acting upon the centrifugal masses. When the driving speed now increases it will finally reach a value, say 999 revolutions per minute; here the spring load equals the centrifugal force. As a mere example, it may be assumed that at the driving speed of 999 revolutions per minute, the spring load and the centrifugal force is 5 lbs. Since now the spring load is balanced, only a slight increase in the centrifugal force is required to overcome the thrust of the spring and to lift the control member 60 suddenly until the member 56 abuts the stop 58. In the above example, it may be said that this sudden lifting and shifting movement will be effected at 1000 revolutions per minute when the centrifugal force has increased from 5 lbs. at 999 revolutions per minute to 6 lbs. at 1000 revolutions per minute, while for the same speed range the increase of the spring load is only 0.5 lb. so that the spring load is now 5.5 lbs. After this shifting movement, the speed may increase beyond 1000 revolutions per minute.

If now the driving speed decreases, for instance due to driving up a hill, the shifting down movement will not be effected at 1000 revolutions per minute because at this driving speed the centrifugal force is still greater than the spring load. As mentioned above, it was assumed that at the speed of 1000 revolutions per minute the centrifugal force is 6 lbs. while the spring load is 5.5 lbs. Consequently, the speed must further decrease until the centrifugal force has decreased to 5.5 lbs. It may be assumed that this is the case when the speed has decreased to 975 revolutions per minute. In this instance, 975 revolutions per minute is the characteristic value for the downward shifting operation, i. e., when shifting down, the centrifugal force and the spring load balance each other at the driving speed of 975 revolutions per minute. Only a slight further decrease of speed, e. g., a decrease from 975 revolutions per minute to 974 revolutions per minute is all that is required to cause the spring load suddenly to overpower the centrifugal force and to return the control member 60 and, thereby, the centrifugal masses 52 to their original position. As a result thereof, the centrifugal force of the masses 52 has suddenly been reduced to a value which is less than 5 lbs., i. e., the spring load at this time. When the speed further decreases below 974 revolutions per minute, the spring load will remain greater than the centrifugal force so that the speed gear remains in the position into which it has just been shifted.

In case the speed has increased beyond 1000 revolutions per minute and reached a predetermined value, for instance 2000 revolutions per minute, at which the second shift is desired, the shifting operation will take place in a similar manner as described above. In other words, the centrifugal force will have increased at that time to a materially greater extent than the total spring load of both springs 54 and 55 or 105 and 106, so that the second piston 62 (Figure 3) or 108 (Figure 4) becomes effective. The downward shifting operation will, however, not take place at 2000 revolutions per minute, but below this value, for the reasons set forth above.

As will be clear from the above, the provision of a speed-responsive regulator with labile characteristics in connection with a power transmission according to the invention, separates the shifting up and shifting down points, so that the swinging back and forth adjacent the shifting points, as encountered with previous speed-responsive regulators, is avoided.

While the drawings illustrate the invention in connection with two springs, that is, for three speeds, it is of course understood that the invention is by no means limited to the employment of two springs for three speeds.

It will be understood that I desire to comprehend within my invention such modifications as come within the scope of the claims.

Having thus fully described my invention, what I claim as new and desire to secure by Letters Patent, is:

1. In a hydraulic transmission, a plurality of hydraulic power transmitters, a source of fluid for filling said transmitters with driving fluid, valve means having a valve member arranged to distribute fluid selectively to said transmitters for effecting a speed change, resilient restoring means continuously urging said valve member into a predetermined position, and a centrifugal member operatively connected with said valve member so as, at the attainment of a predetermined speed, to effect movement thereof in one direction against the thrust of said resilient restoring means, said resilient restoring means being constructed and arranged to produce a labile characteristic for each speed change.

2. In a hydraulic transmission, a plurality of hydraulic power transmitters, a fluid source for filling said transmitters with driving fluid, valve means having a valve member arranged to distribute fluid selectively to said transmitters, a rotatable member, a governor including a centrifugal member associated with said rotatable member and movable therewith, and resilient means adapted to counteract a predetermined centrifugal force acting upon said centrifugal member in one direction, said resilient means being so constructed and arranged as to impart labile characteristics upon said governor, hydraulic connections between said fluid source and said valve means and between said valve means and said transmitters, and means for operatively connecting said valve member to said centrifugal member for motion in response to the motion of said centrifugal member for distributing fluid selectively to said transmitters.

3. In a hydraulic transmission, a plurality of hydraulic power transmitters, a fluid source for filling said transmitters, a centrifugal mechanism operatively connected to one of said transmitters, resilient means cooperating with said centrifugal mechanism and imparting labile characteristics upon the same, and fluid distributing means connected to said fluid source and said transmitters and responsive to the motion of said centrifugal mechanism for selectively distributing fluid to said transmitters.

4. In a hydraulic transmission, a plurality of hydraulic power transmitters, a source of fluid for filling said transmitters, a centrifugal mechanism operatively connected to one of said transmitters, fluid distributing means including a valve connected to said source and said transmitters and responsive to the motion of said centrifugal mechanism for selectively distributing fluid to said transmitters, said valve being movable into a plurality of positions, and a plurality of spring devices imparting labile regulating characteristics upon said centrifugal mechanism and being connected to said fluid distributing means so as to successively oppose the motion imparted thereto by said centrifugal mechanism in one direction, said spring devices being each successively active during movement of the valve in each succeeding position.

5. In a hydraulic transmission, a plurality of hydraulic power transmitters, a source of fluid for filling said transmitters, a centrifugal mechanism operatively connected to one of said transmitters, fluid distributing means including a valve connected to said source and said transmitters and responsive to the motion of said centrifugal mechanism for selectively distributing fluid to said transmitters, said valve being movable into a plurality of positions, and a plurality of spring devices imparting labile regulating characteristics upon said centrifugal mechanism and being connected to said fluid distributing means so as to successively and additively oppose the motion imparted thereto by said centrifugal mechanism in one direction, said spring devices being each successively active during movement of the valve in each succeeding position.

6. In a hydraulic transmission system, a plurality of hydraulic power transmitters, a fluid source for filling said transmitters with driving fluid, valve means having a valve member adapted to be moved into a plurality of positions and arranged to distribute fluid selectively to said transmitters, a rotatable member adapted to be driven by said transmitters, a centrifugal member associated with said rotatable member and movable therewith, and a pair of springs opposing the motion of said valve member by said centrifugal member in one direction, said springs being adapted successively and suddenly to yield in response to a variation of the speed of said rotatable member, said springs being initially loaded with reference to their specific rate in such a manner that one of them and thereafter both in combination impart labile regulating characteristics upon said centrifugal member for the control movements of said valve member.

7. In combination in a power transmission, a plurality of power transmitters, means for selectively making one of said power transmitters effective for obtaining a desired speed, a shiftable control member for controlling said means, a speed responsive governor for controlling said control member, and spring means imparting labile characteristics upon said governor for controlling said control member.

8. In combination in a speed shifting mechanism, a plurality of power transmitting members adapted to be made effective individually for obtaining a plurality of different speeds, a control member operatively connected with said power transmitting members and operable to select the transmitting members to be effective, and a speed responsive governor controlling the actuation of said control member, spring means imparting labile characteristics upon said governor for causing the same to shift up from a first speed to a second speed in response to a predetermined speed of one of said power transmitting members, and to shift down from said second speed to said first speed in response to a speed lower than the said predetermined speed.

9. In a power transmission, a plurality of power transmitters, controlling means for selectively causing one of said power transmitters to become ineffective and another of said power transmitters to become effective to bring about a speed change of said power transmission, resilient restoring means, and a centrifugal member operatively connected with said controlling means and responsive to a predetermined speed of said transmission to effect movement of said controlling means in one direction against the thrust of said resilient restoring means, said resilient restoring means being constructed and arranged to impart a labile characteristic upon said centrifugal member for each speed change.

10. In a power transmission, a plurality of power transmitters, controlling means for selectively making one of said transmitters effective and another one of said transmitters ineffective to bring about a speed change of said transmission, a centrifugal mechanism operatively connected to said controlling means, and resilient means cooperating with and imparting labile characteristics upon said centrifugal mechanism to bring about a speed change from a lower speed to a higher speed in response to a predetermined speed of said transmission and to bring about a speed change from a higher speed to a lower speed in response to a speed of said transmission lower than said predetermined speed.

HUGO KIESER.